United States Patent [19]
Halper

[11] Patent Number: 5,137,147
[45] Date of Patent: Aug. 11, 1992

[54] DISPLAY CONTAINER FOR AUDIO RECORDING MEDIUM JACKET

[75] Inventor: Matthew I. Halper, Morganville, N.J.

[73] Assignee: MLG & S, Inc., Morganville, N.J.

[21] Appl. No.: 785,989

[22] Filed: Oct. 31, 1991

[51] Int. Cl.⁵ .................. A45C 1/00; B65D 85/672; B65D 5/52

[52] U.S. Cl. ................... 206/0.81; 206/45.18; 206/387; 224/42.42; 224/901; D3/35

[58] Field of Search ............... 206/0.81, 45.14, 45.18, 206/45.19, 387; 224/42.42, 901; D3/35

[56] References Cited

U.S. PATENT DOCUMENTS

| | | | |
|---|---|---|---|
| D. 260,323 | 8/1981 | Johnson | D3/35 |
| 1,930,347 | 10/1933 | Meyer et al. | 206/45.19 |
| 3,804,233 | 4/1974 | Gregg, Jr. | 206/387 |
| 4,508,217 | 4/1985 | Long et al. | 206/45.18 |
| 4,948,022 | 8/1990 | VanDyke | 224/42.42 |
| 5,080,452 | 1/1992 | Tuckman | 206/214 X |

FOREIGN PATENT DOCUMENTS 187856  2/1937  Switzerland ................ 206/45.19

*Primary Examiner*—William I. Price
*Attorney, Agent, or Firm*—David L. Davis

[57] ABSTRACT

A container for an audio recording medium jacket is arranged to hold the jacket so that identifying indicia on a side of the jacket is visible when the jacket is installed in the container. The container is so arranged that it may be effectively mounted on either a horizontal or a vertical surface.

6 Claims, 2 Drawing Sheets

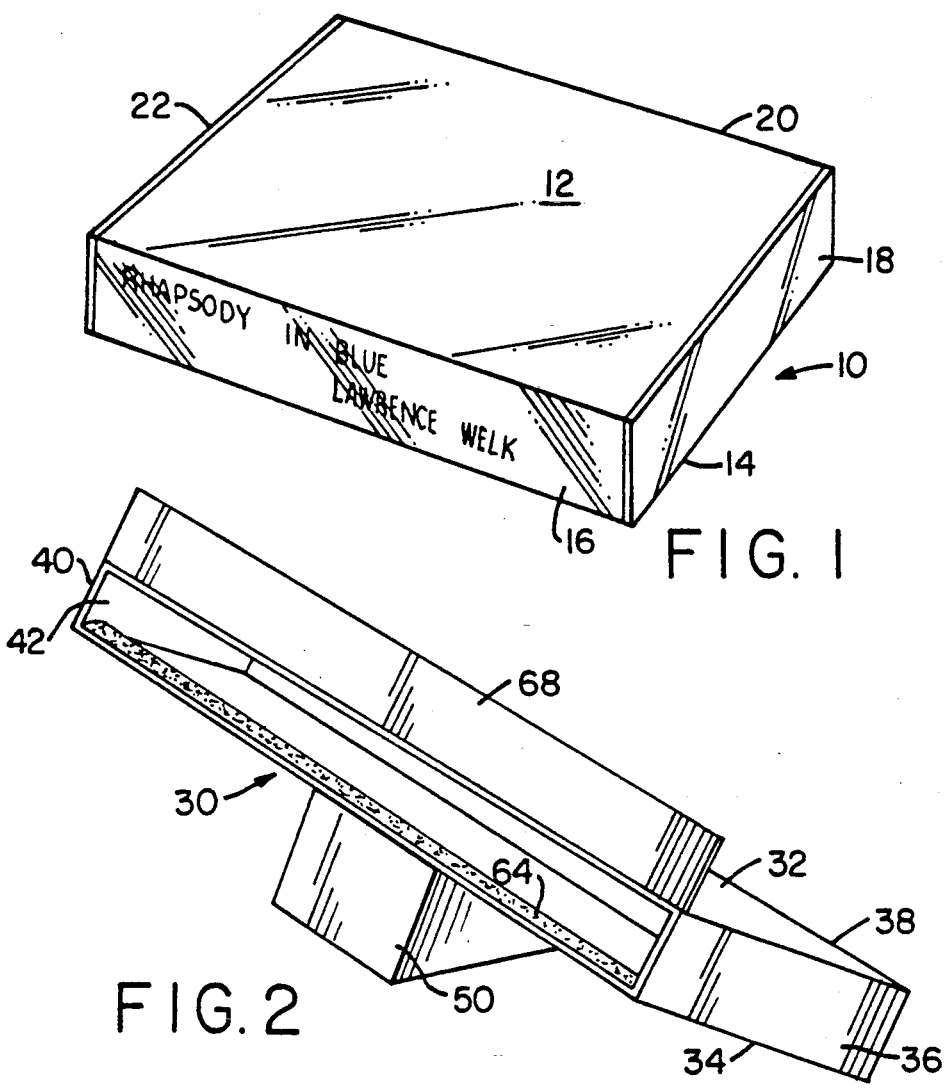
FIG. 1
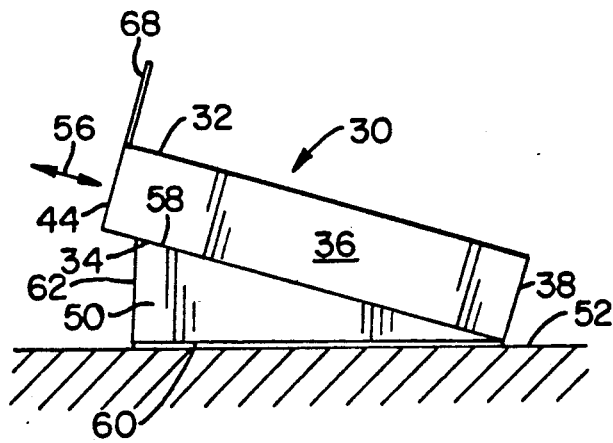
FIG. 2
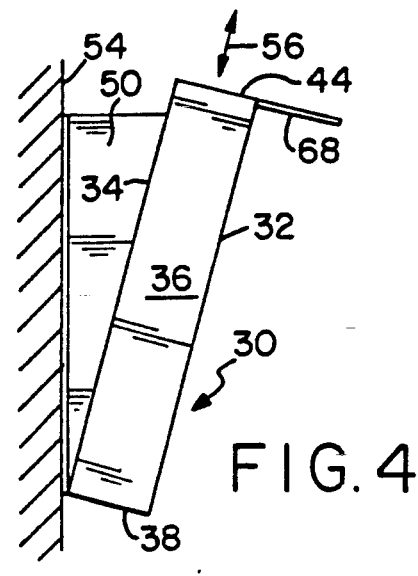
FIG. 3
FIG. 4

DISPLAY CONTAINER FOR AUDIO RECORDING MEDIUM JACKET

BACKGROUND OF THE INVENTION

This invention relates to containers and, more particularly, to a container specifically adapted to hold and display the jacket of an audio recording medium.

It is very commonplace nowadays for automobiles to be equipped with audio cassette tape players and/or compact disc players. These units are typically installed flush with the automobile dashboard and, when operated, an appropriate audio recording medium is inserted into a receiving slot associated with the unit and located on the dashboard. When not inserted in the receiving slot, the recording medium is typically held within a jacket which functions to protect the recording medium both from physical damage and contamination. The jacket usually displays on its face and spine identifying indicia for the specific recording associated with that jacket.

When the automobile operator wishes to play a particular recording, the recording medium is removed from its jacket and inserted into the receiving slot of the player. The jacket must then be placed somewhere for temporary storage while the recording medium is in the player and must be readily accessible when the operator removes the recording medium from the player. Safety hazards are presented if the jacket is merely loosely dropped on the automobile seat or floor. One such safety hazard comes about in the event of a sudden stop or other quick maneuver which can turn the jacket into a projectile. Another safety hazard comes about when the operator attempts to locate the jacket while driving the vehicle.

It is therefore a primary object of the present invention to provide an arrangement whereby the jacket of an audio recording medium can be temporarily stored and be readily accessible.

If the operator leaves the vehicle while the recording medium is still contained within the player and returns to the vehicle at some later time, the operator may not know which recording is being played. It is therefore another object of this invention to provide a jacket container of the type described wherein the recording identifying indicia on the jacket spine is exposed so as to be clearly visible to the operator when the jacket is held in the container.

SUMMARY OF THE INVENTION

The foregoing, and additional, objects are attained in accordance with the principles of this invention by providing a container for an audio recording medium jacket, the jacket being a relatively flat rigid box-like structure having two parallel major sides and four minor sides with a specified minor side on which there is displayed identifying indicia for the specific recording associated with that jacket, the container comprising a relatively flat rigid body member having two parallel major sides and three minor sides defining an open interior space dimensioned to accept therein the jacket, the body member having an open minor side through which the jacket may be inserted into and removed from the interior space, the open side being so located on the body member that when the jacket is inserted in the interior space, the identifying indicia displayed on the specified minor side is exposed, and means for rigidly mounting the body member to a surface so that the planes of the body member major sides are at an acute angle to the surface with the open side being further away from the surface than the three minor sides, the directions of insertion and removal of the jacket through the open side thereby being at the acute angle to the surface.

BRIEF DESCRIPTION OF THE DRAWINGS

The foregoing will be more readily apparent upon reading the following description in conjunction with the drawings in which like elements in different figures thereof are identified by the same reference numeral and wherein:

FIG. 1 is a perspective view of an illustrative audio recording medium jacket which the container according to this invention is adapted to hold;

FIG. 2 is a front perspective view of a first embodiment of a container according to this invention;

FIG. 3 is a side view of the container of FIG. 2 shown mounted to a substantially horizontal surface;

FIG. 4 is a side view of the container of FIG. 2 shown mounted to a substantially vertical surface;

DETAILED DESCRIPTION

Figure 5:
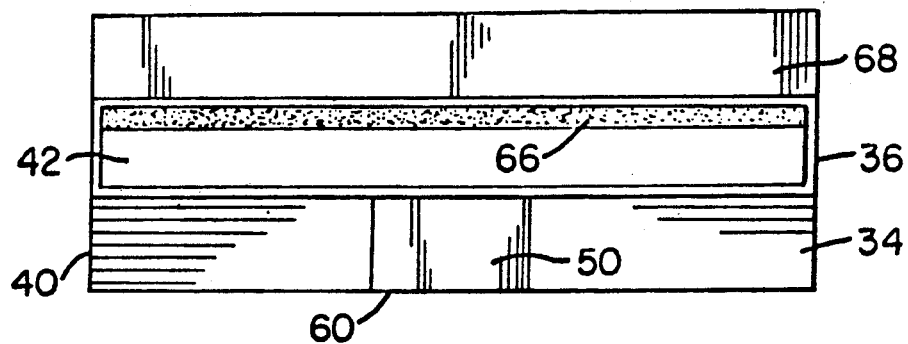
FIG. 5 is a front view of the container of FIG. 2.

Referring now to the drawings, FIG. 1 illustrates a jacket, designated generally by the reference numeral 10, of the type utilized for holding an audio cassette tape. The jacket 10 is a relatively flat rigid box-like structure having two parallel major sides 12 and 14 and four minor sides 16, 18, 20 and 22. A specified one of the minor sides, illustratively the minor side 16 (the spine), has displayed thereon identifying indicia for the specific recording associated with the particular jacket 10. Typically the jacket 10 is formed of clear plastic and the indicia is printed on a cardboard insert so that it is visible through the minor side 16.

FIG. 2 illustrates a container, indicated generally by the reference numeral 30, according to this invention, for holding the jacket 10. The container 30 includes a relatively flat rigid body member which has two parallel major sides 32 and 34 and three minor sides 36, 38 and 40, which together define an open interior space 42 dimensioned to accept therein the jacket 10. Thus, the distance between the interior surfaces of the major sides 32 and 34 of the container 30 is at least as great as the distance between the exterior surfaces of the major sides 12 and 14 of the jacket 10, and the distance between the interior surfaces of the minor sides 36 and 40 of the container 30 is at least as great as the distance between the exterior surfaces of the minor sides 18 and 22 of the jacket 10. Thus, the body member of the container 30 has an open minor side 44 through which the jacket 10 may be inserted into and removed from the interior space 42. When the jacket 10 is inserted into the open interior space 42, the minor side 16 having the identifying indicia is exposed.

In addition to the body member, the container 30 includes a base member 50 which is used for rigidly mounting the body member to a surface. The base member 50 is preferably generally triangular shaped so that the planes of the body member major sides 32, 34 are at an acute angle to the surface to which the container 30 is mounted, with the open minor side 44 being further away from the surface than the other three minor sides 36, 38, 40. FIG. 3 illustrates the container 30 being mounted on a substantially horizontal surface 52 which may be, illustratively, the upper surface of the dashboard of a vehicle. FIG. 4 illustrates the container 30 mounted on a substantially vertical surface 54 which may be, illustratively, the face of the dashboard of an automobile. Thus, as is clear from FIGS. 3 and 4, the directions of insertion and removal of the jacket 10 through the open side 44, as denoted by the double headed arrow 56, is at the above-defined acute angle to the surface to which the container 30 is mounted.

Thus, the base member 50 has a first side 58 secured to the major side 34 of the container 30, a second side 60 adapted to be secured to the surface, and a third side 62 facing the same direction as the open side 44. It is noted that the base member 50 and the container 30 may be molded as a unitary structure. The second side 60 of the base member 50 may be secured to the surface 52, 54 in any known manner such as, for example, by double faced adhesive tape or by hook and loop fastener (i.e., Velcro ®) tape.

Since the jacket 10 and the container 30 are both preferably constructed of hard plastic, and since the dimensions of the open interior space 42 are sufficient to allow the jacket 10 to be freely inserted and removed from the interior space, it is desirable to provide some means for lightly frictionally engaging the jacket 10 within the interior space 42 so that the jacket 10 does not rattle around or fall out. Accordingly, strips 64 and 66 are installed within the open interior space 42, preferably closely adjacent to and flanking the open side 44. The strips 64 and 66 may be of a rubber-like material, or even of a fibrous material such as felt, to provide a light frictional engagement with the jacket 10.

Figure 6:
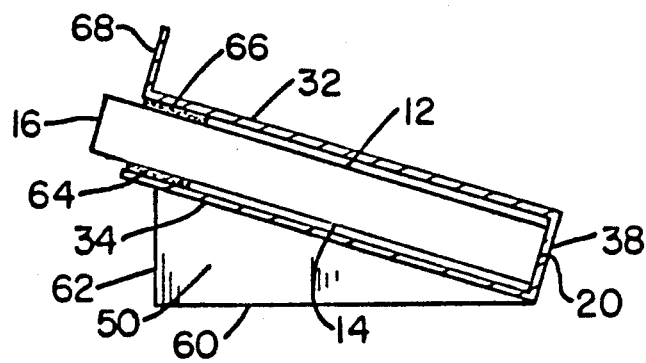
FIG. 6 is a cross sectional view through the container of FIG. 2 showing a jacket of the type illustrated in FIG. 1 installed therein.

As is clear from FIG. 6, the depth of the open interior space 42, from the open side 44 to the opposite side 38, is less than the distance on the jacket 10 from the side 16 to the side 20 so that when the jacket 10 is inserted in the interior space 42 of the container 30, it extends outwardly therefrom a distance sufficient to provide a region for gripping the jacket 10 for its subsequent removal from the container 30.

As shown in the drawings, it may be desired to provide a wall 68 which is an extension of the open side 44 from which there may be provided some slogan such as, for example, "NOW PLAYING", obviously referring to the indicia on the side 16 of the jacket 10 installed in the container 30.

Figure 7:
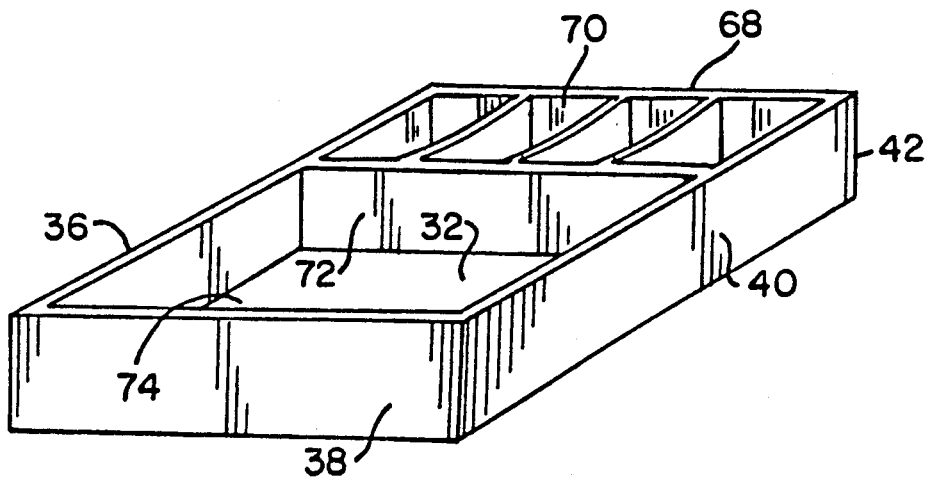
FIG. 7 is a rear perspective view of a second embodiment of a container according to this invention.

FIG. 7 shows a second embodiment for the container 30 wherein the sides 36, 38 and 40 extend upwardly beyond the major side 32 so that together with the wall 68 there is formed a tray for holding assorted articles. Illustratively, the tray can be divided into a coin holder portion 70 separated by a wall 72 from a catch-all region 74.

Accordingly, there has been disclosed a display container for holding an audio recording medium jacket. While a preferred embodiment of the present invention has been disclosed herein, it is understood that various modifications and adaptations to the disclosed arrangement will be apparent to those of ordinary skill in the art and it only intended that this invention be limited by the scope of the appended claims. Thus, for example, while a cassette tape jacket and corresponding container have been specifically disclosed, it is understood that this invention may also be applied to a compact disc jacket, sometimes referred to as a jewel box.

I claim:

1. A container for an audio recording medium jacket, said jacket being a relatively flat rigid box-like structure having two parallel major sides and four minor sides with a specified minor side on which there is displayed identifying indicia for the specific recording associated with that jacket, said container comprising:

a relatively flat rigid body member having two parallel major sides and three minor sides defining an open interior space dimensioned to accept therein said jacket, said body member having an open minor side through which said jacket may be inserted into and removed from said interior space, said open side being so located on said body member that when said jacket is inserted in said interior space, the identifying indicia displayed on said specified minor side is exposed; and means for rigidly mounting said body member to a surface so that the planes of said body member major sides are at an acute angle to said surface with said open side being further away from said surface than said three minor sides, the directions of insertion and removal of said jacket through said open side thereby being at said acute angle to said surface.

2. The container according to claim 1 wherein said mounting means comprises a rigid triangular shaped base member having a first side secured to one of said major sides of said body member, a second side adapted to be secured to said surface and a third side facing the same direction as said open side.

3. The container according to claim 2 further including tray means mounted to the other major side of said body member for holding assorted articles.

4. The container according to claim 3 wherein said tray means includes a coin holder.

5. The container according to claim 1 further including means in said body member interior space for providing a frictional engagement with said jacket.

6. The container according to claim 1 wherein the distance on said body member from said open side to the opposite minor side is less than the distance on said jacket from its specified minor side to the opposite minor side, so that when said jacket is inserted in said interior space of said container it extends outwardly therefrom to provide a region for gripping said jacket.

* * * * *